(12) United States Patent
Mudigonda et al.

(10) Patent No.: US 8,990,801 B2
(45) Date of Patent: Mar. 24, 2015

(54) SERVER SWITCH INTEGRATION IN A VIRTUALIZED SYSTEM

(75) Inventors: Jayaram Mudigonda, San Jose, CA (US); Parthasarathy Ranganathan, Fremont, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1495 days.

(21) Appl. No.: 12/362,876

(22) Filed: Jan. 30, 2009

(65) Prior Publication Data
US 2010/0199275 A1 Aug. 5, 2010

(51) Int. Cl.
*G06F 9/455* (2006.01)

(52) U.S. Cl.
CPC .. *G06F 9/45558* (2013.01); *G06F 2009/45595* (2013.01)
USPC .......................................................... 718/1

(58) Field of Classification Search
CPC .............................. H04L 49/70; G06F 9/45558
USPC .......................................................... 718/1
See application file for complete search history.

(56) References Cited

U.S. PATENT DOCUMENTS

| 7,606,965 | B2* | 10/2009 | Njoku et al. .................. 710/316 |
| 7,657,659 | B1* | 2/2010 | Lambeth et al. .............. 709/250 |
| 7,685,281 | B1* | 3/2010 | Saraiya et al. ................ 709/226 |
| 8,060,875 | B1* | 11/2011 | Lambeth .......................... 718/1 |
| 8,190,769 | B1* | 5/2012 | Shukla et al. ................. 709/238 |
| 2007/0140277 | A1* | 6/2007 | Chen et al. .................... 370/404 |
| 2007/0299906 | A1* | 12/2007 | Bose et al. .................... 709/202 |
| 2008/0005782 | A1* | 1/2008 | Aziz ................................ 726/3 |
| 2009/0070761 | A1* | 3/2009 | Zhao ............................... 718/1 |
| 2009/0119664 | A1* | 5/2009 | Pike et al. ........................ 718/1 |
| 2009/0240790 | A1* | 9/2009 | Utsunomiya et al. ......... 709/221 |
| 2009/0241113 | A1* | 9/2009 | Seguin et al. .................... 718/1 |
| 2011/0029973 | A1* | 2/2011 | Hara et al. ....................... 718/1 |

* cited by examiner

*Primary Examiner* — Andrew Caldwell
*Assistant Examiner* — Benjamin Geib
(74) *Attorney, Agent, or Firm* — Leffert, Jay & Polglaze

(57) ABSTRACT

A switch, a system and operational method for packet switching between virtual machines running in a server and a network. The server comprises a switch with swappable, virtual ports. The switch routes packets to and from the various virtual machines resident in the server memory.

7 Claims, 4 Drawing Sheets

SERVER SWITCH INTEGRATION IN A VIRTUALIZED SYSTEM

BACKGROUND

A virtual machine (VM) is an environment, usually a program or operating system, that does not physically exist but is created within another environment. In this context, the VM is called a "guest" while the environment it runs within is called a "host." Virtual machines can be created to execute an instruction set different than that of the host environment. One host environment can run multiple virtual machines simultaneously. Since virtual machines are separated from the physical resources they use (i.e., memory, CPU cycles), the host environment is often able to dynamically assign those resources among them.

The practice of running many VMs on the same physical server can improve the resource utilization and bring down the total cost of ownership. However, since each VM should be located to have adequate network bandwidth with other VMs, and with the external entities, increasing the number of VMs in a system can have the result of creating a packet throughput bottleneck and prohibitively high CPU utilization.

For the reasons stated above, and for other reasons that will become apparent to those skilled in the art upon reading and understanding the present specification, there is a need in the art for efficient packet switching in a multiple core server system.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure. It is to be understood that other embodiments may be utilized and that process or mechanical changes may be made without departing from the scope of the present disclosure. The following detailed description is, therefore, not to be taken in a limiting sense, and the scope of the present disclosure is defined by the appended claims and equivalents thereof.

Figure 1:
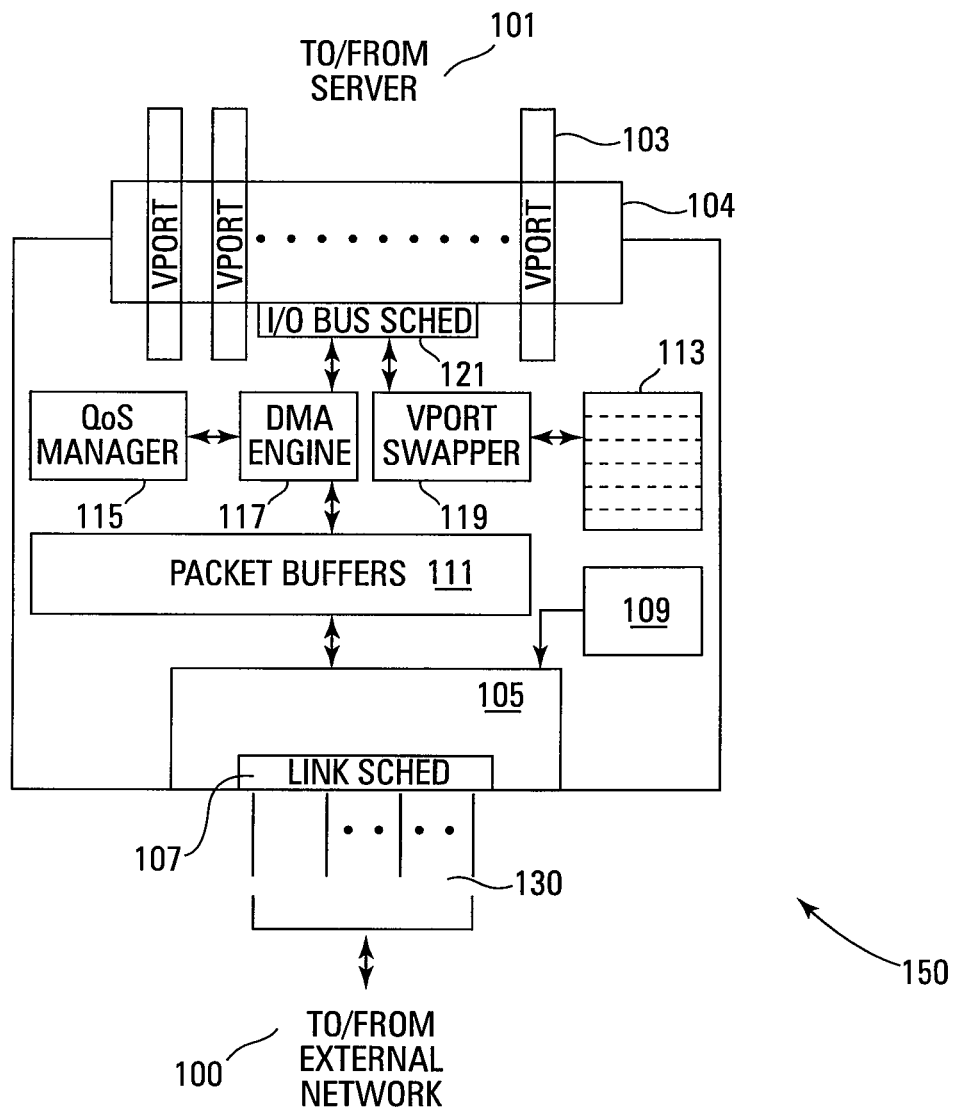
FIG. 1 depicts a block diagram of one embodiment of a switch.

FIG. 1 illustrates a block diagram of one embodiment of a switch 150 that can be used in a virtualized server environment. The switch 150 is comprised of a network side 100 and a server side 101 that couple the switch 150 to the network through a plurality of ports on both sides 100, 101 of the switch. The network side couples the switch 150 to a network through a subset of the ports 130. For example, the network side 100 can be comprised of an Ethernet switch and a plurality of ports 130 coupled to a packet switch 105.

The packet switch 105 is further comprised of a link scheduler 107. The link scheduler 107 enforces the overall network bandwidth allocations for each virtual machine. The link scheduler 107 also ensures adequate latency and other quality of service requirements.

The switch 150 is further comprised of a switch control plane 109 that is coupled to and controls the packet switch 105. The switch control plane 109 participates in network management protocols such as spanning tree, address learning, as well as other protocols.

The server side 101 of the switch 150 is made up of a scalable mechanism that enables a large number of virtual machines to bypass the hypervisor (VMM) and access the switch 150 directly as if it were a traditional network interface card. The server side 101 is comprised of virtual ports (VPorts) 103 that couple the switch 150 to a server.

Each VPort 103 is coupled to a single virtual machine and presents a virtual network interface card interface. These VPorts are carried over the system bus (PCI-E/Front Side Bus). They are referred to as virtual ports since each port is in essence a collection of control data items and the switch 150 minimizes the memory requirements by allowing each port to be swapped out to the system memory.

In one embodiment, only the necessary control data is swapped based on the direction of the data packet and the quality of service class to which it belongs.

The PCI-E/FSB attachment 104, coupled to the plurality of VPorts 103, forms the attachment to the server. The PCI-E/FSB attachment 104 implements the necessary electrical components (such as SERDES) and the protocol processing (such as DLP and TLP layer processing of PCI-E). This block 104 may also participate in coherence protocols such as cHT in the case of an FSB attachment.

An I/O bus scheduler 121 is coupled to the PCI-E/FSB attachment 104. The I/O bus scheduler 121 enforces the overall I/O bandwidth allocations for each of the virtual machines. This can be accomplished by prioritizing the I/O bus transactions and partitioning the I/O bus bandwidth across the virtual machines according to the prioritization.

A VPort swapper block 119 is coupled to the VPorts 103 through the I/O bus scheduler 121. The swapper block 119 manages the VPort swaps to and from the system memory. This block 119 ensures adequate latency and bandwidth for network traffic by intelligently managing the on-board memory to hold the most useful VPorts. The VPort swapper block 119 exploits the packet bursts to maximize the locality (i.e., the probability a given VPort is found in the switch memory). Most applications are known to send bursts of packets (back-to-back sequences) interspersed with long silences. This knowledge can be used to improve accuracy of the guess as to which of the VPorts are not likely to be accessed in the near future.

The VPort table 113, coupled to the VPort swapper 119, provides data on the most active or most useful VPorts to the VPort swapper 119. These data can include the pointers to the corresponding receive and transmit queues, quality of service parameters, and accounting counters.

Packet buffers 111 in the switch 150 are coupled to the packet switch 105 to provide temporary storage for holding data packets prior to being transferred to the server memory. The packet buffers 111 also temporarily store data packets prior to being transmitted to the network.

A direct memory access (DMA) engine 117 is coupled between the packet buffers 111 and the I/O bus scheduler 121. The DMA engine 117 is a means for controlling transfer of data packets to and from the main server memory in response to the instructions from the quality of service manager 115. The DMA engine 117 collaborates with the I/O bus scheduler 121.

In operation, when a new virtual machine is created in the server, a network controller instructs the switch 150 to create a new virtual switch port (i.e., virtual network interface) through the control interface of the switch. The switch 150 first claims a free entry from the VPort table 113 and then allocates a per virtual machine structure in the system memory. The network controller then records a pointer to this structure in a global table of VPorts, and returns its index as the virtual function number to the controller. The network controller then uses this virtual function number to boot up the virtual machine.

When a packet destined for a local virtual machine is received from the network, the network-facing side 100 recognizes the MAC address and forwards it to the server facing side 101. The server side 101 uses the destination MAC address and looks up the VPort cache for the corresponding per virtual machine context. If successful, a quality of service computation is done and the packet is queued up for the DMA engine 117. If not successful, the packet descriptor is queued up in a pending queue and a cache replacement algorithm is nm to select a victim VPort and swap it with the missing context. The DMA read completion for the missing context triggers the re-processing of the packet.

When a virtual machine has a packet to send, it queues up the packet descriptor in its send queue and writes to a register in its virtual network port. When the switch 150 gets the write command, it uses a table pointer to look up the virtual network card cache. If successful, the send queue pointer is extracted, the packet header is read in, and after the quality of service computation, a future time for DMAing the packet payload is determined and the DMA request is queued up. When the DMA for the payload is complete, the packet descriptor is queued up for transmission by the network side 100 on one of the output ports 130.

Figure 2:
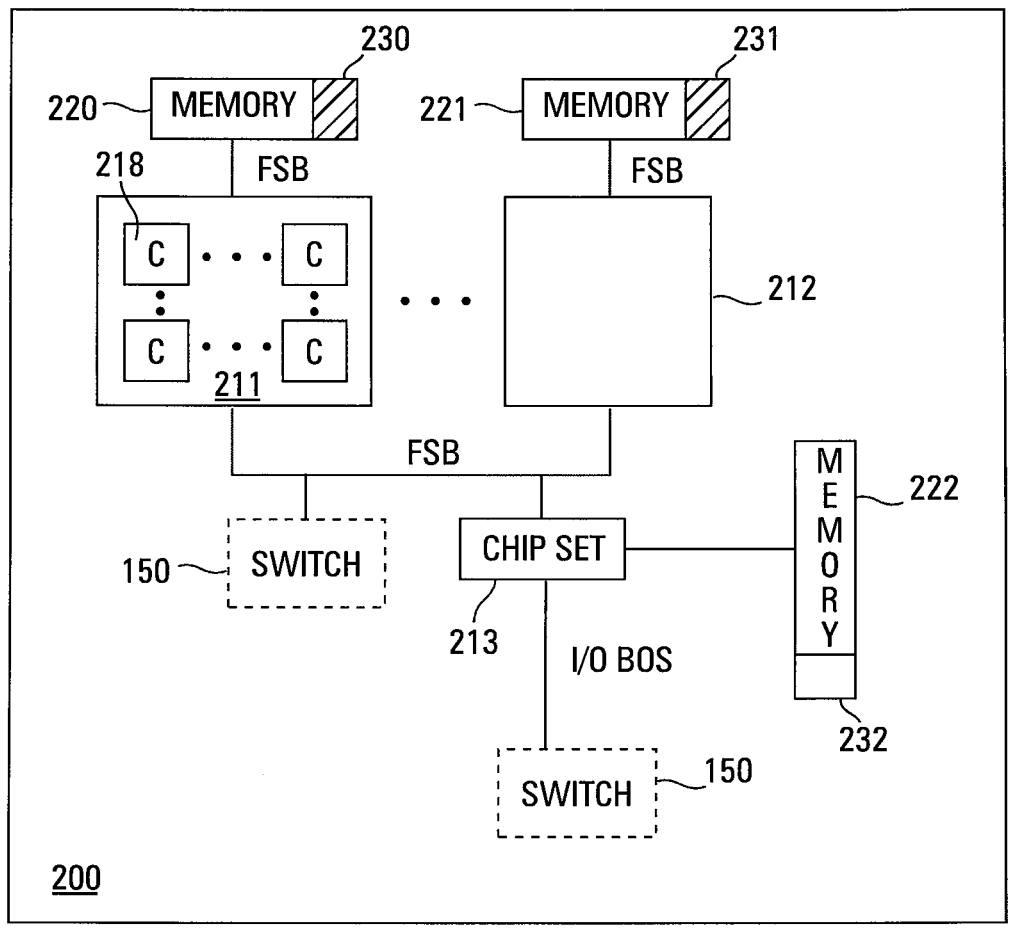
FIG. 2 depicts a block diagram of one embodiment of a virtualized server incorporating the switch of FIG. 1.

FIG. 2 illustrates a block diagram of one embodiment of a typical server 200 that incorporates a switch 150 in accordance with the embodiment of FIG. 1. This figure shows two possible locations in the server 200 to which the switch 150 of FIG. 1 can be coupled. Both locations are coupled to the front side bus (FSB) except the first location is coupled directly to the FSB while the second location goes through an I/O bus such as (PCI-E), and then through a chip set 213 that controls one or more multi-core processors and memory banks 222. Both these couplings allow direct control of the switch 150 by the system software.

The server 200 is further comprised of a plurality of multi-core processors 211, 212 each with their own memory 220, 221. Each processor 211, 212 can be comprised of a plurality of processor cores 218. Each memory block 220-222 is comprised of an area 230-232 for back-up of the virtual port table 113 (see FIG. 1) on the switch 150. In one embodiment, the memory blocks 220-222 are coupled to their respective processors 211-213 through their own front side bus.

Figure 3:
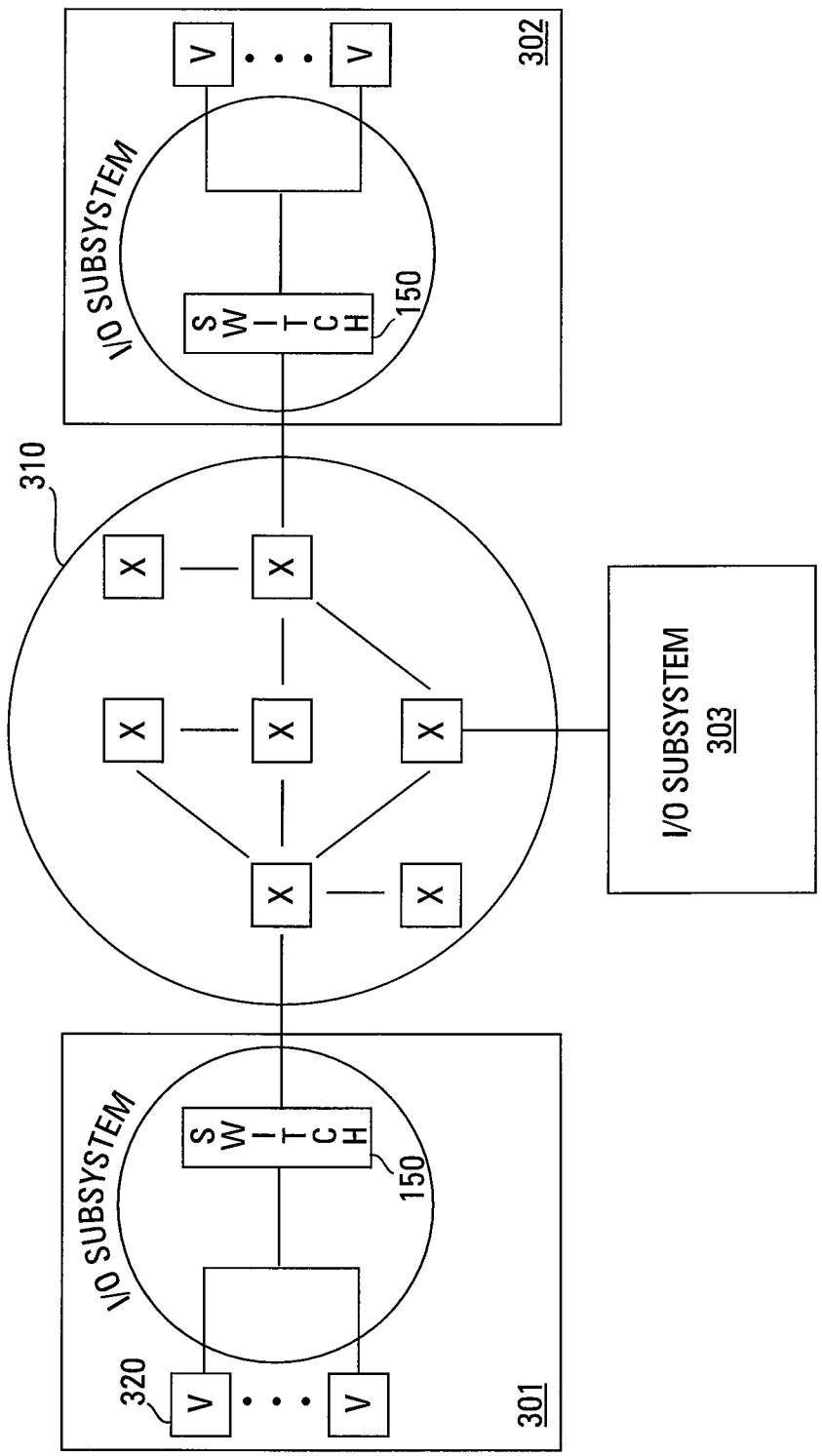
FIG. 3 depicts a block diagram of one embodiment of a system incorporating the virtualized server of FIG. 2.

FIG. 3 illustrates a block diagram of one embodiment of a network that incorporates a server 200 in accordance with the embodiment of FIG. 2. The illustrated network comprises a sub-network 310 that uses standard prior art network switches. This network is coupled to a plurality of I/O sub-systems 301-303. The I/O subsystems 301-303 can be servers such as the servers illustrated in FIG. 2.

FIG. 3 shows three such servers 301-303 coupled to the central sub-network 310. Alternate embodiments can use any number of servers. Each of the servers 301-303 is coupled to the sub-network 310 through a switch 150 as illustrated previously with reference to FIGS. 1 and 2. Each of the servers 301-303 can include multiple virtual machines 320 that are resident in the memory of the servers 301-303.

Figure 4:
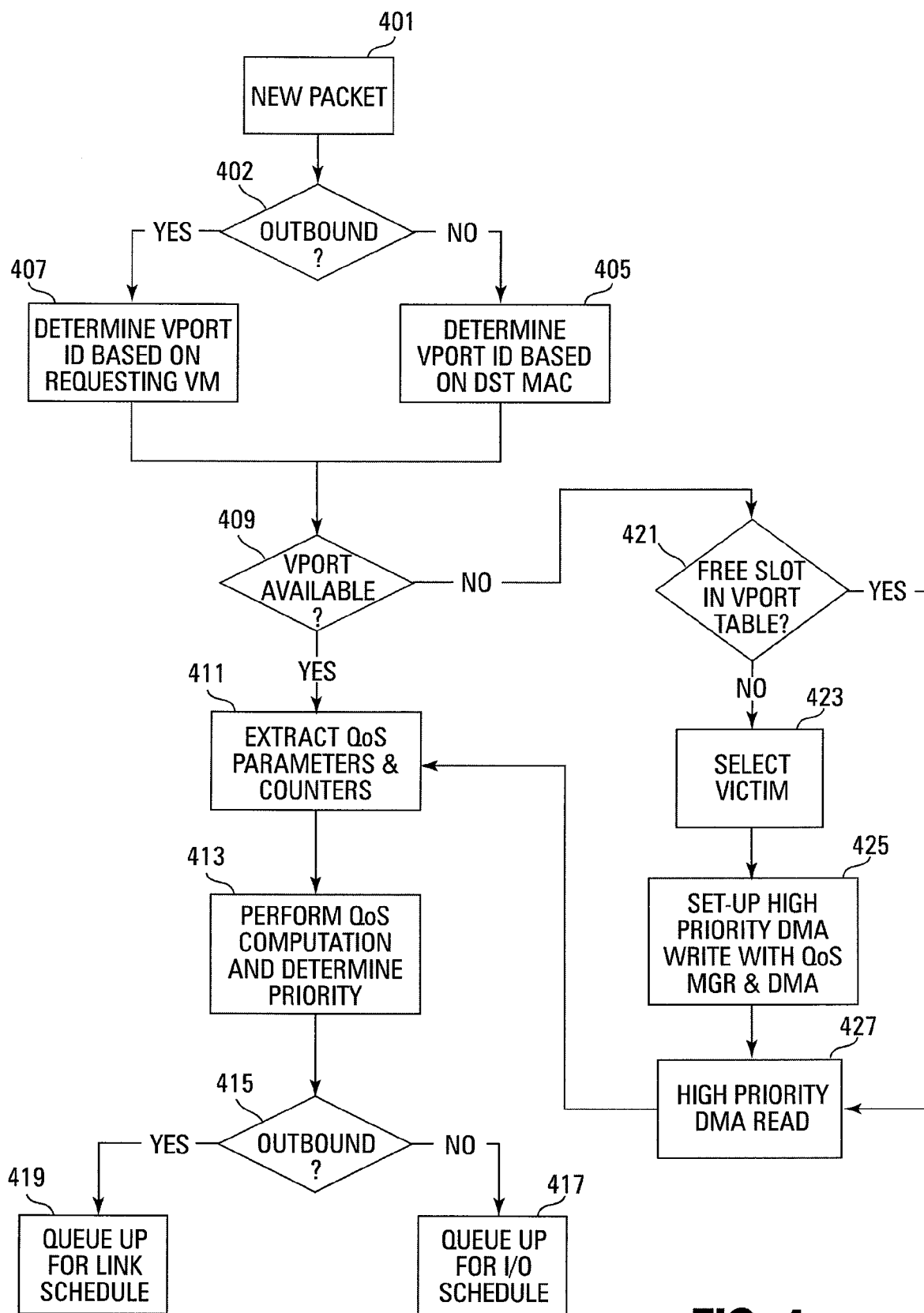
FIG. 4 depicts a flow chart of one embodiment of a method for the operation of a switch in a virtualized server.

FIG. 4 illustrates a flowchart of one embodiment of a method for operation of an integrated server switch in a virtualized system. The method begins at the arrival of a new data packet 401.

It is determined if the data packet is outbound from the server switch 402. If the packet is outbound from one of the local virtual machines to an external destination, the VPort identification based on the requesting virtual machine is determined 407. Such an occurrence might result if a virtual machine has requested the server switch to send a packet. The requesting virtual machine is used to determine the VPort since there is a one-to-one correspondence between them.

If the packet is not outbound from one of the local virtual machines, the VPort identification based on the destination media access control (MAC) address is determined 405. Such an occurrence might result if the packet was just received from the network and should be sent to one of the virtual machines. Incoming packets do not have the virtual machine identification. They identify the destination virtual machine by its MAC address. Again, there is a one-to-one correspondence between the destination MAC address found in the packet and the virtual machine identification that can be translated to the VPort identification. The MAC address is a quasi-unique identifier for identification assigned to most network adapters or network interface cards by a manufacturer.

It is then determined if a VPort is available in the server switch 409. Since the server switch only holds a small number of VPorts (i.e., the control data that represents the VPort) in its local memory, a check is performed to determine if the necessary data is available locally (e.g., checking server memory).

If the VPort is not available in the server switch, a swapping operation is performed. This operation is comprised of determining if there is memory available in the local memory (i.e., a free location in the VPort table) 421. If no table slot is available, a slot is made available by selecting a VPort that is currently in the table 423. A high priority DMA write with quality of service manager and DMA is performed 425 to write the selected VPort back into the back-up copies of the VPort table in the system memory.

Once the write is complete, or a free slot in the VPort table is available, the necessary VPort is read in 427. After a free slot is either determined to be available or made available, the necessary counters, allocations, quality of service parameters, and other data is extracted from the VPort that is available 411. The quality of service computations are then performed 413 to determine the priority of the data packet.

If the data packet was outbound from the local virtual machines 415, the packet is sent for transmission to the link-scheduler for queuing 419. If the data packet was not outbound, the data packet was an incoming packet that is handed over to the I/O scheduler for delivery to the proper virtual machine 417.

In an alternate embodiment, a hypervisor or other system software prioritizes packet direct memory accesses. For example, packets belonging to a guest virtual machine that is currently running should be prioritized.

In summary, by integrating a switch with the server platform, a higher packet throughput can be achieved between communicating virtual machines regardless of their location. Thus, many virtual machines can be run on the same physical server to improve resource utilization and bring down total cost of ownership.

What is claimed is:

1. A server switch integrated in a virtualized system, the server switch comprising:
   a plurality of first ports for coupling the switch to the virtualized system;
   a plurality of second ports for coupling the switch to a network;
   an engine to determine a selective swap of control data between the plurality of first ports and the plurality of second ports based on a direction of transfer and a quality of service assigned to a data packet; and
   a port swapper, coupled to the plurality of first ports, to manage the plurality of first ports, wherein each first port from the plurality of first ports is swapped out to system memory and wherein each swapped first port comprises the control data indicative of the direction of transfer of the data packet between the plurality of first ports and the plurality of second ports and the quality of service assigned to the data packet to determine a priority of the data packet.

2. The server switch of claim 1 wherein each of the plurality of first ports is coupled to a different virtual machine running in the virtualized system.

3. The server switch of claim 1 wherein the plurality of first ports comprises a server side of the switch and the plurality of second ports comprises a network side of the switch.

4. The server switch of claim 1 wherein the engine to control the transfer of data packets comprises a direct memory access engine coupled to a quality of service manager.

5. The server switch of claim 4 further comprising an I/O bus scheduler that collaborates with the direct memory access engine to transfer the data packets.

6. The server switch of claim 1 wherein the port swapper is coupled to a port table to communicate to the port swapper which of the plurality of first ports are most active.

7. The server switch of claim 1 further comprising a packet buffer that couples the plurality of second ports to the DMA engine, the packet buffer to store data packets prior to being transferred from the network to the virtualized system and the packet buffer further to store data packets prior to being transferred from the virtualized system to the network.

* * * * *